(12) United States Patent
Leutgeb et al.

(10) Patent No.: US 9,055,432 B2
(45) Date of Patent: Jun. 9, 2015

(54) TARGETED MUTING FOR COMMUNICATION BETWEEN ELECTRONIC APPLIANCES

(71) Applicant: Infineon Technologies AG, Neubiberg (DE)

(72) Inventors: Thomas Leutgeb, Lieboch (AT); Walter Kargl, Graz (AT); Josef Riegebauer, Ilz (AT)

(73) Assignee: Infineon Technologies AG, Neubiberg (DE)

( * ) Notice: Subject to any disclaimer, the term of this patent is extended or adjusted under 35 U.S.C. 154(b) by 6 days.

(21) Appl. No.: 13/847,838

(22) Filed: Mar. 20, 2013

(65) Prior Publication Data

US 2013/0254844 A1    Sep. 26, 2013

(30) Foreign Application Priority Data

Mar. 21, 2012 (DE) .......................... 10 2012 102 381

(51) Int. Cl.
| | |
|---|---|
| *G06F 21/00* | (2013.01) |
| *H04W 12/00* | (2009.01) |
| *H04B 5/00* | (2006.01) |
| *H04W 12/10* | (2009.01) |
| *H04W 4/00* | (2009.01) |

(Continued)

(52) U.S. Cl.
CPC .............. *H04W 12/00* (2013.01); *H04B 5/0031* (2013.01); *H04W 12/10* (2013.01); *H04W 88/02* (2013.01); *H04W 4/008* (2013.01); *G06Q 20/227* (2013.01); *G06Q 20/3227* (2013.01); *G06Q 20/3278* (2013.01)

(58) Field of Classification Search
USPC ............................................................. 726/3
See application file for complete search history.

(56) References Cited

U.S. PATENT DOCUMENTS 8,290,433 B2 * 10/2012 Fisher et al. ................. 455/41.1
2009/0247078 A1 * 10/2009 Sklovsky et al. ............. 455/41.1

(Continued)

FOREIGN PATENT DOCUMENTS

| CN | 101809554 A | 8/2010 |
|---|---|---|
| CN | 102047748 | 5/2011 |

(Continued)

OTHER PUBLICATIONS

Roland et al, Practical attack scenarios on secure element-enabled mobile devices, IEEE, 2012, pp. 19-24.*

(Continued)

*Primary Examiner* — Luu Pham
*Assistant Examiner* — Ali Shayanfar
(74) *Attorney, Agent, or Firm* — Murphy, Bilak & Homiller, PLLC

(57) ABSTRACT

A method for controlling the flow of data in a near field communication appliance having an interposed element and a plurality of secure elements connected to the interposed element is disclosed. The method includes receiving a first communication at a first one of the secure elements. The first communication is sent by an external appliance and suited to an application located in one of the secure elements. The method further includes testing, by means of the first secure element, whether the first secure element contains the application. The first secure element is muted if the first secure element does not contain the application. A corresponding near field communication appliance and terminals are also disclosed.

20 Claims, 5 Drawing Sheets

(51) Int. Cl.
*G06Q 20/22* (2012.01)
*G06Q 20/32* (2012.01)
*H04W 88/02* (2009.01)

(56) References Cited

U.S. PATENT DOCUMENTS

| | | | |
|---|---|---|---|
| 2010/0178867 A1* | 7/2010 | Charrat | 455/41.1 |
| 2012/0238206 A1* | 9/2012 | Singh et al. | 455/41.1 |
| 2012/0295588 A1* | 11/2012 | Chen et al. | 455/411 |
| 2013/0217325 A1* | 8/2013 | Ingels | 455/41.1 |

FOREIGN PATENT DOCUMENTS

| | | |
|---|---|---|
| CN | 202035051 U | 11/2011 |
| WO | 2010011055 A2 | 1/2010 |

OTHER PUBLICATIONS

Monterio et al, A secure NFC application for credit transfer among mobile phones, IEEE, 2012, pp. 1-5.*

* cited by examiner

TARGETED MUTING FOR COMMUNICATION BETWEEN ELECTRONIC APPLIANCES

PRIORITY CLAIM

This application claims priority to German Patent Application No. 10 2012 102 381.6, filed on 21 Mar. 2012, the content of said German application incorporated herein by reference in its entirety.

TECHNICAL FIELD

The invention relates to communication methods between electronic appliances, and particularly to the control of communication within an appliance which is used for near field communication, specifically in the 13.56 MHz band, and to appliances with accordingly controlled communication.

BACKGROUND

It is expected that mobile electronic appliances will be increasingly equipped with additional radio frequency (RF) communication functions. By way of example, this relates to mobile telephones, portable media players, smartphones, personal digital assistants (PDAs), handheld games consoles, tablet computers, laptop computers, etc. Besides their conventional functions, these appliances will thus be capable of performing additional communication functions. The range of applications for RF communication functions includes, in particular, contactless chip card functions, such as bookings, payments, purchases and the like, but also simple terminal-to-terminal communication initiated by the user, for example for the exchange of photographs, MP3 songs or business cards. Such additional RF communication functions are increasingly being implemented using what is known as near field communication (NFC) engineering.

NFC engineering is a wireless short range connectivity technique which allows simple and secure two-way interactions between electronic appliances. This allows consumers to perform contactless transactions, access digital contents and connect electronic appliances or apparatuses. In other words, NFC engineering allows contactless, bidirectional communication between appliances. These elements may be mobile telephones, computers, consumer electronics, cards, tags, signs, posters, washing machines and the like which are equipped with NFC. An appliance equipped with NFC engineering can basically operate in a read/write, peer-to-peer or card emulation mode.

NFC engineering is standardized as a contactless technique in the 13.56 MHz frequency band. The ISO 14443 standard is a basic building block for a large part of the near field operations. NFC engineering is generally compatible with at least the type A and type B ISO 14443 standards. The components of an NFC session comprise initiators and targets. The initiator is the element which starts and manages the communication and the interchange of data. The target responds to requests from the initiator. A feature of NFC engineering is that elements can act either as an initiator or as a target. NFC engineering requires a dedicated RF chipset and an antenna to be integrated in the mobile element.

In a known configuration, the ISO 14443 standard is mapped in a mobile terminal onto a contact-based, transparent interface between, by way of example, an NFC frontend and a secure element, the secure element being able to be in the form of a smartcard, for example. When physical proximity between the terminal and a contactless external terminal is set up, for example in order to make an electronic payment, RF communication is used to set up communication between the terminal and the mobile terminal. On the basis of the ISO 14443 standard, the communication between the wireless terminal and the secure element on which an application for handling the payment transaction is hosted is usually transparent in this case. This means that the NFC frontend as an interposed element passes the data stream through between the secure element (SE) and the external wireless terminal in both communication directions almost without alteration. In this case, mere decoding is not regarded as a break in the transparency so long as the transported information is not altered. This transparency is advantageous because, inter alia, it increases the communication speed as a result of absent intermediate steps in the NFC frontend, and also the security of the overall process.

It is to be expected that commercially available terminals, such as mobile telephones, will each increasingly be equipped with multiple secure elements, or at least the option of using multiple elements, in a foreseeable time. The reason for this, inter alia, is that there has been no internationally recognized industrial standard to date which provides a standard format for a secure element for the different market players in the area of near field communication. By way of example, these include manufacturers of mobile terminals such as mobile telephones and tablet computers, etc., mobile radio providers, providers of payment systems, etc. The individual players have different channels and options for bringing the hardware of their payment systems to the customer. In the case of a mobile telephone manufacturer, this may be, by way of example, the installation of a complete near field communication system, including an NFC frontend and a permanently installed, i.e. soldered, for example, secure element. By contrast, the mobile radio provider is usually totally unable, or has only very limited ability, to influence the hardware of the terminal and will therefore provide a secure element, for example, in the form of or as a combination with a SIM card, which, as known from conventional mobile radio technology, the end user inserts into his mobile telephone, e.g. instead of his conventional previous SIM card without a secure element. A further option is a secure element in the form of a chip card (smartcard) or SD card, for example, which is inserted into a card slot in the terminal, that is to say in the mobile telephone, handheld computer or tablet computer, for example.

ISO standard 14443 defines the communication between a secure element and an NFC frontend. One way of providing, by way of example, a plurality of payment systems in a mobile terminal with near field communication capability, such as a mobile telephone, is to provide the relevant applications associated with the different payment systems on the same secure element (multi-application secure element). However, this provides only little flexibility insofar as, by way of example, the provider of a payment system may first need to come to an agreement with that market player which controls access to the secure element of the relevant terminal, for example a mobile radio provider in the case of a SIM card. Depending on the market structure and competition circumstances, this may turn out to be uneconomical, complicated or ultimately impossible for the provider of a payment system. Technical incompatibilities between the relevant applications and certain types of secure elements may be a further technical and economic obstacle.

Against this background, there is a need for methods and apparatuses which allow different applications for near field communication to be implemented in a terminal without being reliant on access to a particular secure element.

SUMMARY

In a first exemplary embodiment, the invention relates to a method for controlling the flow of data in a near field communication appliance having an interposed element and a plurality of secure elements connected to the interposed element in a transparent manner. The method comprises receiving a first communication at a first one of the secure elements, the first communication sent by an external appliance and suited to an application located in one of the secure elements; testing, by means of the first secure element, whether the first secure element contains the application; and muting the first secure element if the first secure element does not contain the application.

In a further exemplary embodiment, the invention relates to a near field communication system that includes a near field communication appliance comprising a plurality of secure elements and an interposed element transparently connected to the secure elements. The near field communication appliance is operable to receive a first communication at a first one of the secure elements, the first communication sent by an external appliance and suited to an application located in one of the secure elements. The near field communication appliance is also operable to test, by means of the first secure element, whether the first secure element contains the application, and mute the first secure element if the first secure element does not contain the application.

Those skilled in the art will recognize additional features and advantages upon reading the following detailed description, and upon viewing the accompanying drawings.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts. In the drawings.

DETAILED DESCRIPTION

Figure 1:
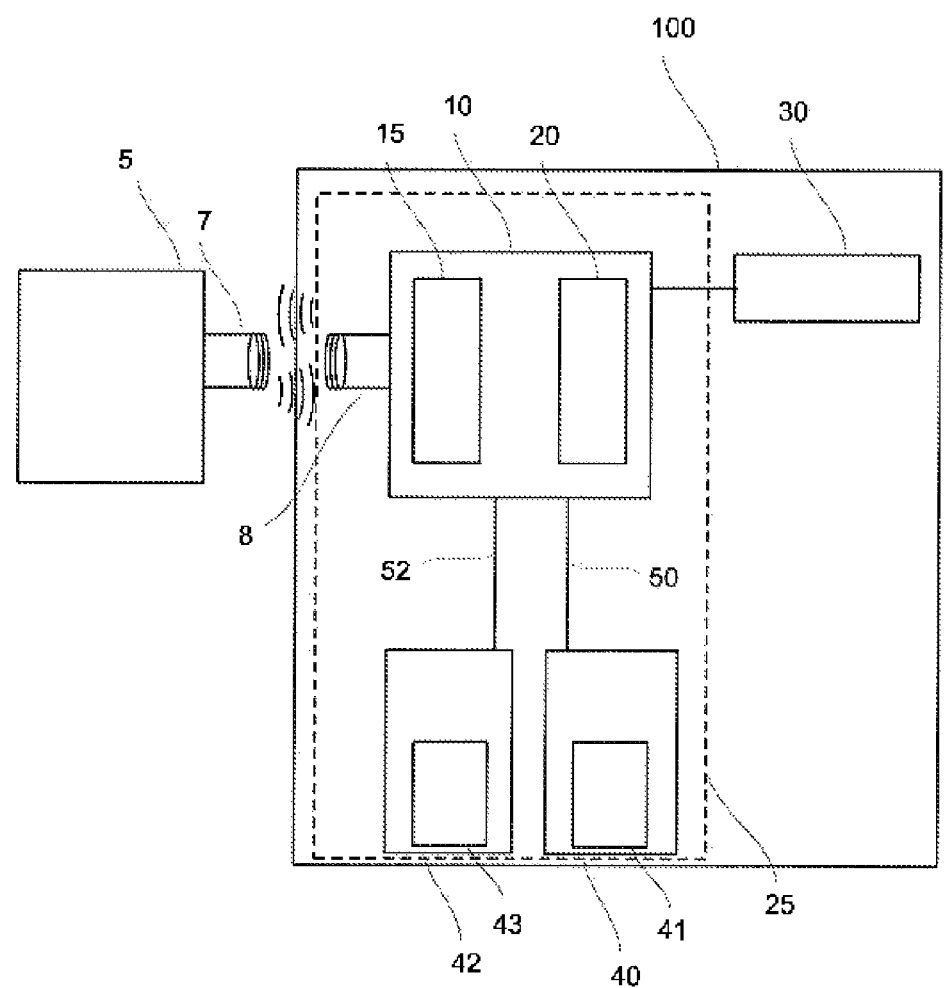
FIG. 1 shows a schematic illustration of a near field communication appliance incorporated in a terminal, based on exemplary embodiments of the invention.

The text below describes various embodiments of the invention, some of which are also illustrated by way of example in the figures. In the description of the figures which follows, identical reference symbols relate to components which are the same or similar. In general, only differences between various embodiments are described. In this context, features which are described as part of one embodiment can also readily be combined in connection with other embodiments in order to produce yet further embodiments.

Exemplary embodiments relate to a method for controlling the communication in an NFC terminal which comprises an NFC frontend and at least two secure elements. In this case, the assurance is provided that a communication arriving from an external appliance, for example a contactless terminal, is answered preferably without or with a small time offset by precisely that secure element from the plurality of secure elements present which has the application suited to or associated with the incoming communication. It is thus possible to address an application in one or more secure elements regardless of whether one or more secure elements are connected.

This selection or assurance of precisely targeted communication can be made in different ways based on exemplary embodiments. In this case, typically the standard transparency of the communication between the external appliance (that is to say a contactless NFC terminal, for example) and the NFC frontend with a secure element can be interrupted at least for a short time, during which a decision or switch is made for the secure element which contains the application suited to the incoming communication and which can therefore be stipulated as the actual terminal point for the communication in the near field communication appliance. At the same time, the methods and appliances described in exemplary embodiments can usually be used to ensure that in this case the break in the transparency cannot be detected by the external appliance, that is to say that the course of the communication outwardly appears as if it were completely and consistently transparent.

The term "transparency" or "transparent connection" used herein is defined as follows. Based on exemplary embodiments, an interposed element, which is an NFC frontend in one implementation, for example, is a bridge between an external NFC terminal and the secure elements incorporated in the NFC appliance according to the invention or else a host component. Transparency is thus intended to be understood to mean that the NFC frontend merely performs the conversion of the RF information (that is to say in the 13.56 MHz band, for example) into digital information. In this case, the data stream coded in the RF communication (e.g. based on the ISO 14443 standard) or the bit sequence that is coded in is merely converted from the RF signal by the NFC frontend, that is to say by means of analog-to-digital conversion. The resulting bit sequence is then forwarded to the transparently linked secure element without further alteration. This is what is intended to be understood by "transparency" or "transparent connection of interposed element and secure element" within the context of this specification.

An example of a break in the transparency would be when the decoded bit stream is buffer-stored or buffered in the interposed element for a defined, significant period of time, for example, that is to say is essentially not forwarded in real time. In this case, one of the conditions surrounding whether or not the connection between the interposed element and a secure element can be regarded as transparent can be defined herein as follows. When the period of time for the delay between the reception of a first, RF-modulated bit by the interposed element and the forwarding of the bit is longer than the period of time which is required for calculation based on the input bit rate for the transmission of a byte, the connection can no longer be regarded as transparent by definition. In other words, transparency is meant to involve the "residence time" of a bit in the interposed element being shorter than or no more than equal to a period of time which is equivalent based on the input data rate for transmitting a byte. In this context, significant changes in the bit sequence, for example as a result of a change in the coding method owing to decoding and subsequent recoding, are also deemed a break in the transparency. Short, systematic time delays, for example as a result of an interposed shift register in the digital path, should not be considered to be a break in the transparency, on the other hand. In principle, a break in the transparency is indicated by all bit-oriented operations on the decoded data stream which go beyond the above.

The concept described above, of linking the incoming communication to the suitable secure element transparently toward the outside, with the transparency of the communication being able to be broken internally, is achieved in multiple variants based on proposed exemplary embodiments.

Based on exemplary embodiments, the method involves at least one secure element being muted in a controlled manner. In this case, the communication can be transferred from a first secure element to another secure element (handover), specifically when the application is resident on a different secure element than the first secure element carrying out the steps of protocol activation. In that case, a secure element communicating with the external terminal in a transparent manner is muted or remains muted as soon as a request is received which is associated with an application which is not hosted on this secure element. In the case of a contact-based interface implementing the contactless protocol based on ISO 14443-2/3/4 between an NFC frontend and a secure element, this may involve the following. Initially, the communication between the external terminal and the secure element is transparent as standard, which means that all data coming from the RF interface of the NFC frontend are routed directly to the secure element and vice-versa, and are sent from there to the external terminal again in the outbound case. Following reception of the "Select Application Identifier" (subsequently also "Select AID" command), the secure element establishes whether or not the requested application is included/hosted. If the secure element establishes that it does not itself contain the requested application, but rather another secure element or else an application host additionally connected to the NFC frontend contains the requested application, the secure element remains muted so as not to influence or disturb the communication of the other secure element or of the application host. The variants cited above can also be combined with methods for power management which are described later herein. In this context, an NFC frontend, by way of example, controls the operating state of the connected secure elements, which means that, by way of example, only the secure elements with which communication is taking place or imminent are in a switched on state in a type of time slot method.

FIG. 1 shows an apparatus based on exemplary embodiments. A terminal 100 with NFC capability comprises an NFC appliance (near field communication appliance) 25 which has an interposed element 10 (typically an NFC frontend, also: contactless frontend, CLF, or NFC modem). This acts as a bridge or hub in the communication between an external NFC terminal/reader 5 and a plurality of secure elements 40, 42, at least one of which has or hosts an application. Each of the secure elements 40, 42 has a coding/decoding unit 41, 43 and is connected to the NFC frontend 10 by means of wired interfaces 50, 52.

Figure 5:
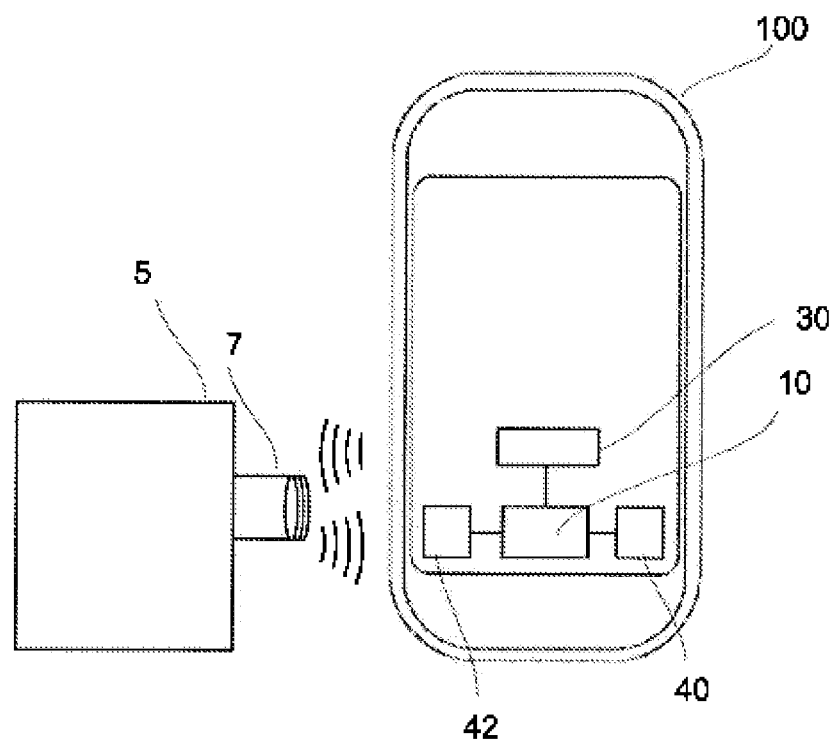
FIG. 5 shows a terminal based on exemplary embodiments.

Based on exemplary embodiments, the NFC frontend 10 with its analog RF interface 15 and encoder/decoder unit 20 together with the secure elements 40, 42 and a host component 30 is part of a terminal 100 with NFC capacity (shown only schematically in FIG. 1, in this regard see also FIG. 5). The secure elements 40, 42 typically each comprise an encoder/decoder unit 41, 43. The terminal 100 may be based on a multiplicity of mobile or fixed terminals, as listed at the outset. By way of example, these include mobile telephones, portable media players, smartphones, personal digital assistants (PDAs), handheld games consoles, tablet computers, laptop computers, consumer electronics, cards, tags, signs, posters or household appliances. In this context, the host component 30 is representative and a simplified version of all of the electronics hardware and software which the terminals 100 contain besides the NFC-related part. FIG. 1 also shows an external terminal 5 or contactless reader which can make contact with the near field communication appliance 25 based on embodiments.

Figure 2:
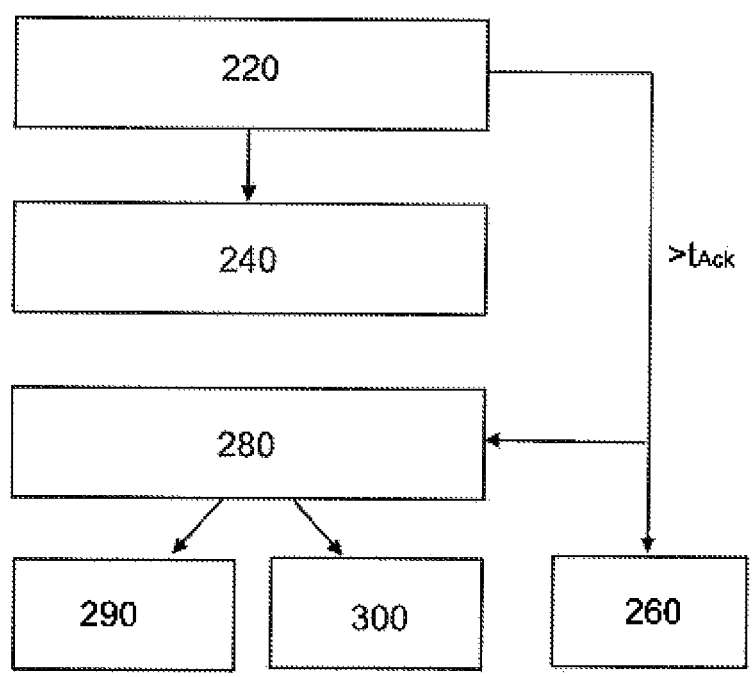
FIG. 2 schematically shows a method based on exemplary embodiments of the invention.

Based on exemplary embodiments, a secure element 40, 42 can be deactivated or muted in a targeted manner. This is shown schematically in FIG. 2 as method 200. Following reception of a "Select AID" request, the secure element 40, 42 transparently connected to the interposed element 10 verifies whether that secure element 40, 42 contains the addressed application (block 220). If so, the secure element 40, 42 continues to execute the application and needs to send the response within a defined period of time $t_{ACK}$ and to set up communication with the external appliance 5 (block 240). If the verification shows a negative result, the secure element 40, 42 remains muted in order to prevent a negative response ("not acknowledged") from being sent to the external terminal 5 (block 260). In the meantime, the NFC frontend 10 can forward the request to other secure elements 40, 42 (block 280). If neither the first secure element nor a further secure element 40, 42 register a response at the NFC frontend 10 after the defined period of time $t_{ACK}$, the NFC frontend 10 responds to the external terminal 5 with "not acknowledged" (block 290). Otherwise, the secure element 40, 42 which contains the target application begins communication with the external appliance 5 (block 300).

Figure 3:
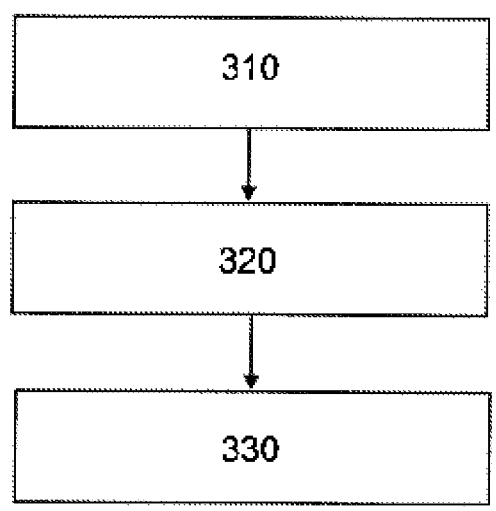
FIG. 3 schematically shows another method based on exemplary embodiments of the invention.

FIG. 3 shows a method 300 for controlling the flow of data in a near field communication appliance 25 having an interposed element 10 and a plurality of secure elements 40, 42 which are connected to the interposed element 10 based on exemplary embodiments. The method 300 comprises receiving a first communication, sent by an external appliance, which is suited to an application that is located in one of a plurality of secure elements of the near field communication appliance, by a first secure element (block 310). The method also comprises testing, by means of the first secure element, whether that secure element contains the relevant application (block 320), and muting the first secure element if the first secure element does not contain the relevant application (block 330).

Figure 4:
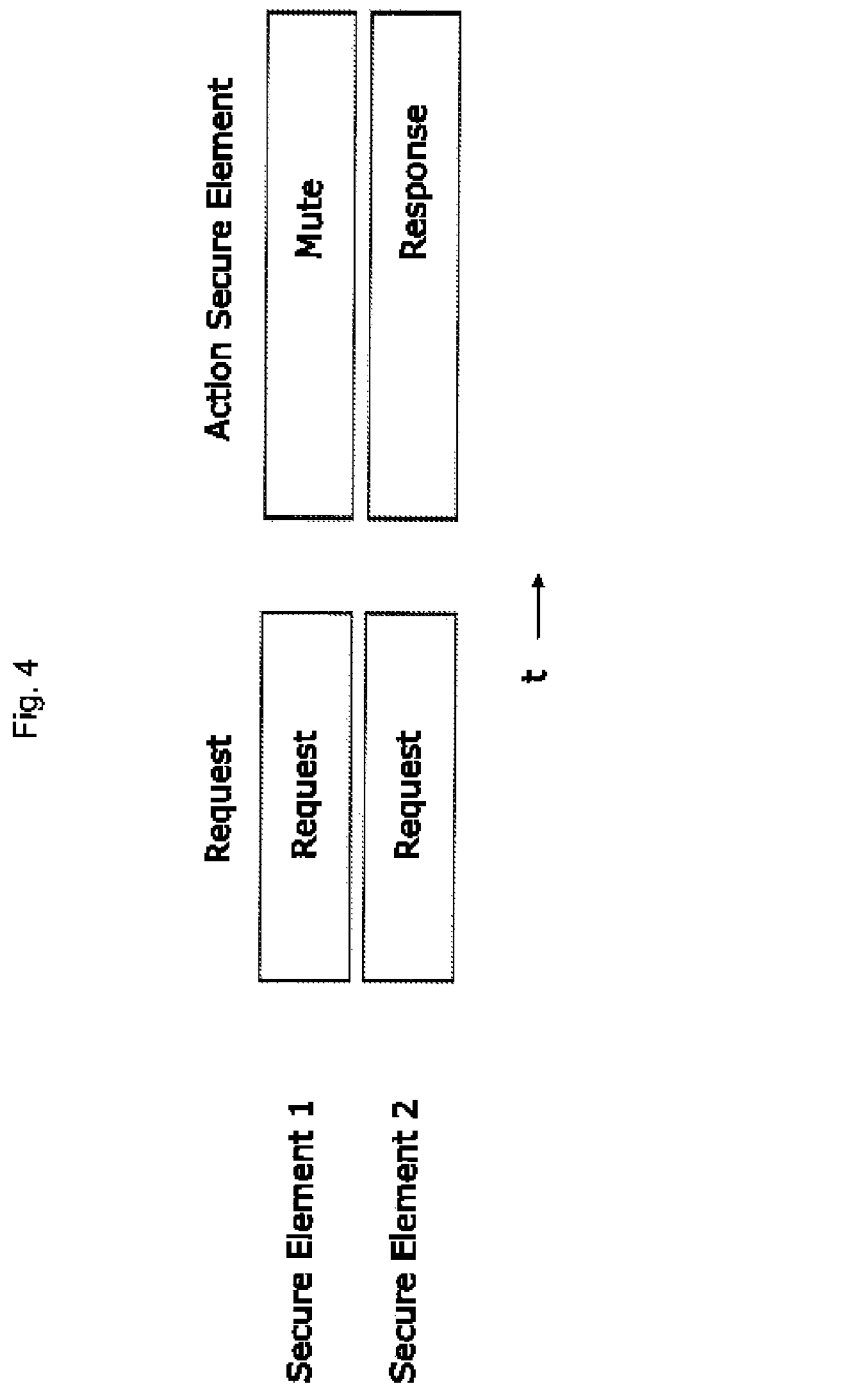
FIG. 4 schematically shows a timing diagram based on exemplary embodiments.

FIG. 4 schematically shows a timing example for a method based on exemplary embodiments. An RF request received from the outside, a request from an external appliance, is forwarded by the interposed element to the secure elements 1 and 2 in decoded form ('Request'). The secure element 2 which contains the addressed application responds to the external appliance ('Response') in reply to the request, while secure element 1 is muted ('Mute'), because secure element 1 does not contain the application addressed in the external request ('Request').

Based on exemplary embodiments, a transparently connected secure element 40, 42 handles the activation at the level of the RF protocol and also has routing or forwarding information. This requires the secure element 40, 42 (see FIG. 1) to collect information about the layer 3 level from all the secure elements 40, 42 which are present in the NFC communication appliance 25 before the communication with the external appliance/terminal 5 begins. In this case, the NFC frontend 10 monitors/observes all externally arriving data in parallel. In the case of an externally incoming application selection command "Select AID" (Select Application ID), this command needs to be identified by the NFC frontend 10 and the transparent secure element 40, 42. The NFC frontend 10 then sends the request to all the buffered interfaces, for example secure elements which are interfaced by means of the Single Wire Protocol (SWP) and/or other interface types. If the transparent secure element 40, 42 is the host of the addressed application, that secure element responds accordingly within a defined period of time which is definitively below the frame delay time at RF level. In this case, the frame delay time is defined as the maximum permitted time for sending a response, as negotiated with the external reader/terminal 5 (also: RWD or Read Write Device). However, if the transparent secure element 40, 42 establishes that the addressed application is not hosted on any of the connected or present secure elements 40, 42, that secure element responds with a "not acknowledged", likewise in a period of time shorter than the frame delay time at RF level. If the transparent secure element 40, 42 establishes that the application is hosted on another secure element 40, 42, that secure element remains muted. The NFC frontend 10 awaits the response on the buffered interface (e.g. SWP) and routes a positive response to the "Select AID" request to the RF interface 15 and hence to the external terminal 5. This response may be delayed in relation to the response of the secure element 40, 42, but as before needs to be below the defined frame delay time at RF level. The interface 50, 52 between NFC frontend 10 and secure element 40, 42 does not need to be deactivated in this case, or can be deactivated later.

Based on exemplary embodiments with targeted deactivation, a transparent secure element 40, 42 handles the activation at a level of the RF protocol while, as a departure from the case above, however, the NFC frontend 10 (and only in the optimal case the secure element) has routing or forwarding information. This requires the secure element 40, 42 to collect all the information about the layer 3 level from all the secure elements 40, 42 present before the communication with the external appliance/terminal 5 begins. In this case, the NFC frontend 10 monitors/observes all externally arriving data in parallel. In the case of an externally incoming "Select AID" command, this command needs to be identified by the NFC frontend 10 and the transparent secure element 40, 42. The NFC frontend 10 then sends the request to all the buffered interfaces. If the transparent secure element 40, 42 is the host of the addressed application, that secure element responds accordingly within a defined period of time which is definitively below the frame delay time at RF level. However, if the transparent secure element 40, 42 establishes that the addressed application is not hosted on any of the secure elements 40, 42, that's secure element responds with a "not acknowledged", likewise in a period of time shorter than the frame delay time at RF level. A further difference over the case described further above is that the transparent secure element 40, 42 remains muted when it establishes that it does not itself contain the application. The interface 50, 52 between NFC frontend 10 and secure element 40, 42 does not need to be deactivated, or can be deactivated later.

Based on exemplary embodiments, the level of the application layer, that is to say ISO 14443 layer 3, for example, can be handled by the interposed element in this case, for example an NFC frontend 10. The two (in this nonlimiting example) secure elements 40, 42 are in this case always set to the mode of the application layer. This can be accomplished either by virtue of layer 3 commands being sent by the NFC frontend 10 before the beginning of the RF communication with the external terminal 5, or by virtue of fundamental configuration of the secure elements 40, 42 in a manner such that they automatically start at the level of the application layer. Before the "Select AID" command, the NFC frontend 10 activates the interface 50, 52 to a secure element 40, 42. The NFC frontend 10 then verifies whether this secure element 40, 42 is hosting the addressed application. If so, this secure element 40, 42 continues executing the relevant application. If the secure element 40, 42 does not contain the application, the NFC frontend 10 deactivates the interface 50, 52 to that secure element 40, 42, and the communication is passed on to another secure element 40, 42. Finally, the communication is switched to the transparent mode again by means of the interfaces 50, 52.

In exemplary embodiments, the above methods and appliances may also be combined with methods for power management. This means that a central unit, in this case typically the NFC frontend, to which other appliances are connected, can be switched on and off for the purpose of communication in a targeted manner in order to control whether communication with these appliances is at all possible at a particular time. This consequently affords an elegant solution for an NFC frontend to simultaneously control communication and lower power consumption. Switching on in a time slot method thus makes it possible to ensure that only the secure element(s) which is/are currently required is/are ever switched on and consuming current.

Since the induced current is limited, care should be taken to ensure that only the absolutely necessary number of elements is active. Based on the timeout times, which may be different for different commands, the corresponding secure element can be made to change its power consumption. The NFC frontend needs to take into account the timeout time in this case before a further secure element is activated. The NFC frontend can also cut off the power supply for particular secure elements after particular timeouts if this secure element is no longer required. For the power management, appropriate hardware and/or software means are typically implemented in the interposed element.

FIG. 5 shows a mobile terminal 100, in this case a smartphone, with a near field communication appliance or system 25 according to ISO 14443 based on exemplary embodiments. In embodiments, the mobile terminal 100 may be, inter alia, a portable media player, a smartphone, a personal digital assistant (PDA), a handheld games console, a tablet computer, a smart card or a personal computer, particularly a laptop.

A person skilled in the art will readily understand that not only can the method based on embodiments that is described here be performed in the variants described in detail, it can also, in principle, be used for a multiplicity of applications. In particular, it is suitable for electronic appliances implemented on the basis of a standard which are intended to have the standard data communication between appliances or elements speeded up.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method for controlling the flow of data in a near field communication (NFC) appliance having an interposed element and a plurality of secure elements connected to the interposed element, the method comprising:

receiving a first communication at a first one of the secure elements within the NFC appliance, the first communication sent by an external appliance and suited to an application located in one of the secure elements;

testing, by means of the first secure element, whether the first secure element contains the application; and muting the first secure element in response to the first secure element not containing the application to prevent the first secure element from sending a not acknowledged message to the external appliance, wherein the interposed element is a communication bridge or hub between the external appliance and the secure elements included in the NFC appliance, and wherein the interposed element is separate from the secure elements and physically connected to the secure elements over an interface.

2. The method of claim 1, wherein the muting is performed by the first secure element.

3. The method of claim 1, wherein at least one of the secure elements has information about the applications which are present in all of the secure elements.

4. The method of claim 1, wherein the first communication is routed by the interposed element to at least one additional one of the secure elements.

5. The method of claim 1, further comprising sending a response signal within a defined period of time tAck by the secure element which contains the application, wherein tAck is shorter than or equal to a frame delay time negotiated with the external appliance.

6. The method of claim 1, wherein the muting of the first secure element is followed by further communication between the external appliance and a second one of the secure elements which contains the application.

7. The method of claim 6, wherein the further communication is transparent and follows a connection setup between the external appliance and the second secure element.

8. The method of claim 1, wherein the external appliance is an NFC reader and the near field communication appliance is part of a mobile terminal having an NFC function.

9. The method of claim 1, wherein the interposed element is an NFC frontend.

10. The method of claim 1, further comprising measuring in order to prevent data collisions between the secure elements by means of targeted power management.

11. The method of claim 1, wherein the communication between the external appliance and the near field communication appliance is based on ISO 14443.

12. A near field communication system, comprising:
a near field communication appliance, comprising:
a plurality of secure elements; and
an interposed element transparently connected to the secure elements,
wherein the near field communication appliance is configured to:

receive a first communication at a first one of the secure elements within the NFC appliance, the first communication sent by an external appliance and suited to an application located in one of the secure elements;

test, by means of the first secure element, whether the first secure element contains the application; and mute the first secure element in response to the first secure element not containing the application to prevent the first secure element from sending a not acknowledged message to the external appliance, wherein the interposed element is a communication bridge or hub between the external appliance and the secure elements included in the near field communication appliance, and wherein the interposed element is separate from the secure elements and physically connected to the secure elements over an interface.

13. The near field communication system of claim 12, wherein the muting is performed by the first secure element.

14. The near field communication system of claim 12, wherein the near field communication appliance is further configured to send a response signal within a defined period of time tAck by the secure element which contains the application, wherein tAck is shorter than or equal to a frame delay time negotiated with the external appliance.

15. The near field communication system of claim 12, wherein the near field communication appliance is configured to mute the first secure element and then have further communication between the external appliance and a second one of the secure elements which contains the application.

16. The near field communication system of claim 15, wherein the further communication is transparent and follows a connection setup between the external appliance and the second secure element.

17. The near field communication system of claim 12, wherein the near field communication appliance is further configured to measure in order to prevent data collisions between the secure elements by means of targeted power management.

18. The near field communication system of claim 12, wherein the communication between the external appliance and the near field communication appliance is based on ISO 14443.

19. The near field communication system of claim 12, wherein the near field communication system is a mobile terminal.

20. The near field communication system of claim 18, wherein the mobile terminal is a mobile telephone, a portable media player, a smartphone, a personal digital assistant (PDA), a handheld games console, a tablet computer, a smart card or a personal computer.

* * * * *